(12) United States Patent
Jin et al.

(10) Patent No.: US 11,105,638 B2
(45) Date of Patent: Aug. 31, 2021

(54) METHOD, APPARATUS, AND COMPUTER READABLE STORAGE MEDIUM FOR UPDATING ELECTRONIC MAP

(71) Applicant: Baidu Online Network Technology (Beijing) Co., Ltd., Beijing (CN)

(72) Inventors: Yonggang Jin, Beijing (CN); Xianpeng Lang, Beijing (CN); Changjie Ma, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 0 days.

(21) Appl. No.: 16/231,021

(22) Filed: Dec. 21, 2018

(65) Prior Publication Data

US 2019/0204094 A1    Jul. 4, 2019

(30) Foreign Application Priority Data

Dec. 29, 2017   (CN) .......................... 201711484235.2

(51) Int. Cl.
   *G01C 21/32*   (2006.01)
   *G05D 1/00*    (2006.01)
   (Continued)

(52) U.S. Cl.
   CPC .......... *G01C 21/32* (2013.01); *G05D 1/0044* (2013.01); *G05D 1/0251* (2013.01); *G06K 9/00791* (2013.01); *G01C 21/3602* (2013.01)

(58) Field of Classification Search
   CPC .................................................. G06K 9/00791
   See application file for complete search history.

(56) References Cited

U.S. PATENT DOCUMENTS

| 9,672,739 B2 | 6/2017 | Onozawa et al. |
| 2010/0004855 A1 | 1/2010 | Liao |

(Continued)

FOREIGN PATENT DOCUMENTS

| CN | 101275854 A | 10/2008 |
| CN | 107451526 A | 12/2017 |

(Continued)

OTHER PUBLICATIONS

Motoko OE et al.; "Camera Position and Posture Estimation from Image Sequence Using Feature Landmark Database"; IEICE Technical Report, vol. 104, No. 572; Jan. 13, 2005, with English abstract; ISSN: 0913-5685 (9 pages).

(Continued)

*Primary Examiner* — Imran K Mustafa
(74) *Attorney, Agent, or Firm* — Nixon Peabody LLP

(57) ABSTRACT

A method, apparatus, and computer readable storage medium for updating an electronic map are disclosed. A method for updating an electronic map includes: acquiring a group of collected images collected by a collection entity and associated with a target map element in the electronic map, the target map element having a target image and a target location; executing inter-group matching between the group of collected images and the target image; executing intra-group matching among the group of collected images; and updating a location of a to-be-updated map element associated with the target map element based on the inter-group matching, the intra-group matching and the target location. In this way, the positioning precision of map elements can be improved.

21 Claims, 3 Drawing Sheets

(51) Int. Cl.
*G05D 1/02* (2020.01)
*G06K 9/00* (2006.01)
*G01C 21/36* (2006.01)

(56) References Cited

U.S. PATENT DOCUMENTS

| | | | |
|---|---|---|---|
| 2017/0299397 A1 | 10/2017 | Ichikawa et al. | |
| 2018/0024568 A1* | 1/2018 | Fridman | G05D 1/0246 701/28 |
| 2018/0231387 A1* | 8/2018 | Thiel | G01C 21/3602 |

FOREIGN PATENT DOCUMENTS

| | | |
|---|---|---|
| EP | 3130891 A1 | 2/2017 |
| JP | 2005098853 A | 4/2005 |
| JP | 2009037062 A | 2/2009 |
| JP | 2012-155660 A | 8/2012 |
| JP | 2016180980 A | 10/2016 |
| JP | 2017194527 A | 10/2017 |
| KR | 10-2017-0052488 A | 5/2017 |
| WO | WO 2013/098980 A1 | 7/2013 |

OTHER PUBLICATIONS

Junji Sato et al.; "Construction of a Street Image Map and Change Direction in Streetscapes from GPS Coordinated Omni-Directional Image Sequences"; The IEICE Transactions on Information and Systems, vol. J90-D, No. 4; Apr. 1, 2007, with English abstract (16 pages).

Park, Woo Jin et al.; "The Selection Methodology of Road Network Data for Generalization of Digital Topographic Map"; Journal of the Korean Society of Surveying, Geodesy, Photogrammetry and Cartography, vol. 31, No. 3, pp. 229-238; Jun. 26, 2013; with English abstract; http://dx.doi.org/10.7848/ksgpc.2013.31.3.229 (10 pages).

* cited by examiner

METHOD, APPARATUS, AND COMPUTER READABLE STORAGE MEDIUM FOR UPDATING ELECTRONIC MAP

CROSS-REFERENCE TO RELATED APPLICATIONS

This application claims priority to Chinese Patent Application No. 201711484235.2, filed with the China National Intellectual Property Administration (CNIPA) on Dec. 29, 2017, the content of which is incorporated herein by reference in its entirety.

TECHNICAL FIELD

Embodiments of the disclosure mainly relate to field of electronic map, and more specifically to a method, apparatus, and computer readable storage medium for updating an electronic map.

BACKGROUND

At present, the autonomous driving technology has increasingly attracted extensive attentions. In the autonomous driving of a vehicle, it is necessary to position the vehicle using an electronic map. In order to ensure the positioning precision, and further to ensure the reliability of the autonomous driving operation, very high requirements are usually brought forward on mapping the electronic map. For example, it is required that the precision of the electronic map shall be as high as possible, because the precision of the electronic map will affect the positioning precision of the vehicle. It is further required that relevant data of the electronic map shall be as accurate and comprehensive as possible. For example, it is necessary to include detailed navigation and positioning information, such as detailed traffic signboard and location information. The traffic signboard includes, e.g., speed limit boards, parking signposts, entrance and exit indicators, and special road segment signs. The traffic signboard may also include detailed lane lines and location information on respective road segments. The autonomous driving technology also requires that the key information of the map can be updated continuously in time. In addition, the map is further required to be capable of covering all drivable road segments.

A traditional approach of mapping an electronic map is on-site surveying and mapping with the help of a surveying and mapping vehicle, and surveying and mapping equipment. Though this surveying and mapping approach is highly precise, it has very limited coverage and very slow update speed, thereby is difficult to meet the demand of the autonomous driving technology. Another traditional approach of mapping an electronic map is to collect monitoring data of vehicles traveling on roads, and then use these data for mapping maps. The advantages of this approach are fast update and wide coverage, but its precision usually fails to meet the requirements for the autonomous driving technology.

SUMMARY

Illustrative embodiments according to the disclosure provide a method, apparatus, and computer readable storage medium for updating an electronic map.

A first aspect of the disclosure provides a method for updating an electronic map. The method acquires a group of collected images collected by a collection entity and associated with a target map element in the electronic map. The target map element has a target image and a target location. The method further executes inter-group matching among the group of collected images and the target image, and intra-group matching between the group of collected images. Then, the method updates a location of a to-be-updated map element associated with the target map element based on the inter-group matching, the intra-group matching, and the target location.

A second aspect of the disclosure provides an apparatus for updating an electronic map. The apparatus includes: an image acquisition module configured for acquiring a group of collected images collected by a collection entity and associated with a target map element in the electronic map, the target map element having a target image and a target location; a first matching module configured for executing inter-group matching between the group of collected images and the target image; a second matching module configured for executing intra-group matching among the group of collected images; and a first updating module configured for updating a location of a to-be-updated map element associated with the target map element based on the inter-group matching, the intra-group matching, and the target location.

A third aspect of the disclosure provides a device. The device includes one or more processors, and includes a memory for storing one or more programs. The one or more programs enable, when executed by the one or more processors, the one or more processors to implement the method according to the first aspect of the disclosure.

A fourth aspect of the disclosure provides a computer readable medium storing a computer program therein. The program implements, when executed by a processor, the method according to the first aspect of the disclosure.

It should be understood that the content described in the summary part is neither intended to limit key or important characteristics of the embodiment of the disclosure, nor used for limiting the scope of the disclosure. Other characteristics of the disclosure will become readily understood based on the following description.

BRIEF DESCRIPTION OF THE DRAWINGS

The above and other characteristics, advantages, and aspects of the embodiments of the disclosure will become more apparent by referring to following detailed description in conjunction with the accompanying drawings. Identical or like reference numerals in the drawings represent identical or similar elements.

DETAILED DESCRIPTION OF EMBODIMENTS

Figure 1:
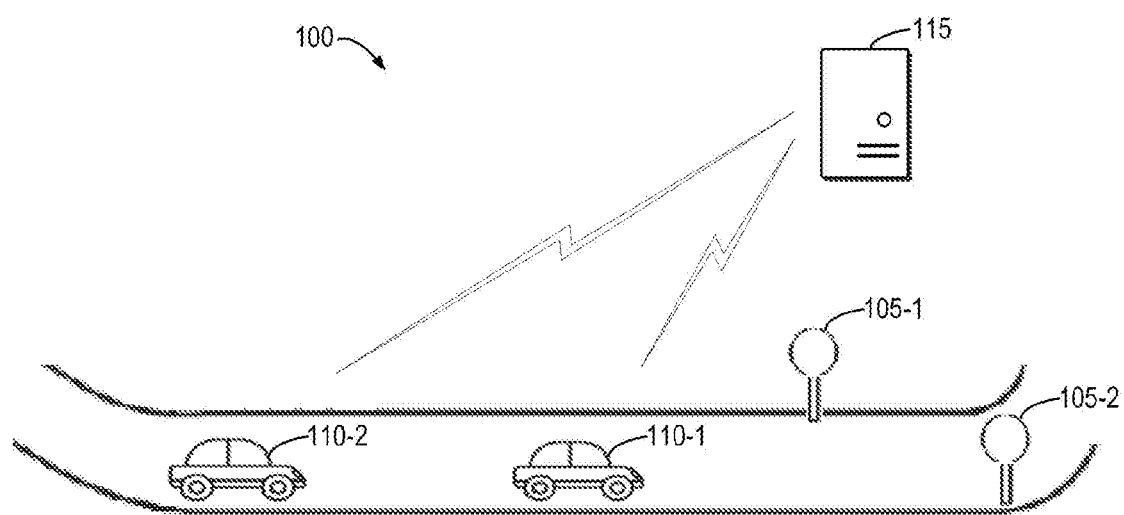
FIG. 1 shows a schematic diagram of an exemplary environment in which a plurality of embodiments of the disclosure can be implemented.

Embodiments of the disclosure will be described in more detail hereinbelow by referring to the accompanying drawings. While some embodiments of the disclosure are shown in the drawings, it should be understood that the disclosure may be implemented in various forms, and should not be construed as limited to the embodiments set forth herein. Rather, these embodiments are provided to more thoroughly and completely understand the disclosure. It should be understood that the drawings and embodiments of the disclosure are only used as examples, rather than limiting the scope of protection of the disclosure.

As used herein, the term "map element" refers to any appropriate element capable of forming an electronic map. The map element may be any appropriate object in a real environment denoted by the electronic map. As an example, in an electronic map denoting an autonomous driving road segment, the map element may include a traffic signboard and a lane line, such as speed limit boards, parking signposts, entrance and exit indicators, and special road segment signs. In other scenarios, the map element may be a landmark in an environment.

In the description on embodiments of the disclosure, the term "include" and wordings similar to the term should be understood as open-ended inclusion, i.e., "including but not limited to." The term "based on" should be understood as "at least partially based on." The term "one embodiment" or "the embodiment" should be understood as "at least one embodiment." The terms, such as "first," and "second," may refer to different or identical objects. Other explicit and implicit definitions may also be included hereinafter.

As mentioned above, the autonomous driving technology has very high requirements on the electronic map. For example, the electronic map is required to be as accurate, comprehensive and detailed as possible, and is required to be capable of being continuously updated in time. A traditional approach of mapping an electronic map is to map a map based on on-site surveying and mapping using a surveying and mapping vehicle, and surveying and mapping equipment. The electronic map mapped using this approach has limited coverage and is very slowly updated.

Another traditional approach is to map a map based on monitoring data of vehicles traveling on roads. This approach can collect image information about map elements and corresponding location information from vehicles traveling on roads, and update the electronic map of corresponding road segments based on such information. This approach has fast update speed and wide coverage, however its precision usually fails to meet the requirements. For example, the precision of an electronic map mapped using this approach usually depends on the number of pieces of collected road monitoring data and the precision of each piece of monitoring data. However, because no special surveying and mapping vehicles or surveying and mapping equipment is used, and usually a vehicle only equipped with a low-end image collection entity is adopted and satellite positioning data is used, the precision of the obtained monitoring data is relatively low. Therefore, the precision of the mapped electronic map will also be relatively low.

At present, a visual odometry (VO for short)/visual inertial odometry (VIO for short) technology has been presented to improve the precision of the mapping approach based on the monitoring data of vehicles traveling on roads. By using the VO/VIO technology, locations of a vehicle and map elements can be determined based on interframe information of collected adjacent images and, for example, positioning information in a global positioning system (GPS). However, the precision of an electronic map generated using this approach still fails to meet the requirements of the autonomous driving technology.

An embodiment of the disclosure presents an efficient electronic map update solution. In the solution, map elements in the electronic map have not only locations, but also images and characteristics of the images. The images may be collected by a special surveying and mapping vehicle or surveying and mapping equipment. The images and characteristics of the images of the map elements can be used as visual data of the map elements, and are included in the electronic map data together with the geometrical data of the map elements (e.g., attribute, size, or locations of the map elements), thereby establishing a visual layer of the electronic map.

The solution further collects a plurality of collected images collected by a collection entity. The collection entity may be one vehicle in a large number of vehicles traveling on roads. After acquiring the collected images, inter-group matching between the collected images and images of the map elements is executed, and intra-group matching among the collected images is executed. Then, a location of a to-be-updated map element associated with the map element is updated based on the inter-group matching, the intra-group matching and the locations of the map elements. The to-be-updated map element may be a map element for matching, or a new map element that is associated with the map element for matching (for example, in the vicinity of the map element) and is excluded in the electronic map.

Relative positioning of the collection entity and relative positioning of the map element can be determined through the inter-group matching. By executing the intra-group matching, on the one hand, movement of the collection entity can be considered when determining the above relative location, and on the other hand, a relative location between the to-be-updated map element and the collection entity can be determined. Therefore, positioning precision of the collection entity can be improved, and positioning precision of the to-be-updated map element can be improved. Furthermore, by collecting images collected by a plurality of collection entities and executing corresponding processing, not only the positioning precision can be further improved, but also the location updating can be fast implemented in time.

FIG. 1 shows an exemplary environment 100 in which a plurality of embodiments of the disclosure can be implemented. In this example, the environment 100 is a segment of an express highway. However, it should be understood that this is for illustrative purposes only. The environment 100 may be any appropriate outdoor environment or indoor environment.

A plurality of map elements 105-1 and 105-2 (collectively referred to as map elements 105) that can form an electronic map are arranged in the environment 100. The map elements 105 may be included in the electronic map, or be excluded in the electronic map. In this example, the map elements 105 are traffic signboards arranged on the sides of a lane in the environment 100, e.g., speed limit boards, parking signposts, entrance and exit indicators, and special road segment signs.

It should be understood that the map elements 105 may be any appropriate reference object arranged at any appropriate location in the environment 100 in any appropriate way. In some embodiments, the map elements 105 may be traffic signboards arranged right above or side above a lane, or be a lane line. It should also be understood that while FIG. 1 only shows two map elements 105, this is merely for exemplary purposes, and is not intended to present any limitation. According to actual needs, any appropriate number of map elements may be arranged in the environment 100.

In the environment 100, images of the surrounding environment are collected by collection entities 110-1 and 110-2 (collectively referred to as the collection entities 110). In this example, the collection entities 110 are vehicles traveling on the express highways. Specifically, images in the environment 100 may be collected by an image capturing device (not shown) installed on the vehicles. The image capturing device may be any appropriate device having an image capturing function. For example, the image capturing device may be a camera or a dash cam recorder installed on a vehicle. As an alternative, the image capturing device may be a portable device carried by a passenger on a vehicle, such as a mobile phone, a laptop computer, a tablet computer, and a digital camera. The collection entities 110 may also be any appropriate other device capable of collecting images of the surrounding environment. For example, in an embodiment where the environment 100 is an indoor environment, the collection entity may be a portable device carried by a pedestrian.

In various embodiments of the disclosure, two types of collection entities 110 may be used. One type of collection entities only collects images without executing image processing. Locations of to-be-updated map elements can be updated by matching among these images, and matching between these images and images of the map elements forming the visual layer of the electronic map. After collecting images, the other type of collection entities can automatically process the images, thereby obtaining relevant information denoting the locations of the map elements in the electronic map. By using this kind of location information, the locations determined by image matching can be further updated or calibrated, thus further improving the precision of the electronic map. Specific embodiments in this aspect will be described in detail hereinafter by referring to FIG. 2.

It should be understood that, for exemplary purposes only, two collection entities are shown in FIG. 1. The environment 100 may include any appropriate number of collection entities and computing devices. In some embodiments, the images in the environment 100 can be collected by a large number of collection entities, to further improve positioning precision of the map elements. Specific details in this aspect will be described in detail hereinafter.

In this example, the collection entities 110 can collect images including the map elements 105. As shown in the figure, the collection entities 110 can upload the collected images to a computing device 115 in the environment 100 for subsequent processing. The computing device 115 may be any appropriate device having a computing capacity. In this example, the computing device 115 is implemented by a cloud server. In some embodiments, the computing device 115 may be a desktop computer, a notebook computer, an intelligent terminal, or the like having a very strong processing capacity.

Any appropriate number of computing devices 115 may be arranged in the environment 100. For example, a plurality of distributed computing devices may be arranged in the environment 100. Relevant processing functions of the computing devices 115 are implemented by the distributed computing devices, thus further improving the processing capacity.

In the embodiments of the disclosure, the computing devices 115 can acquire data of the map elements in the electronic map, such as the locations, and the images. The data may be stored in the computing devices 115 or in other devices (for example, a storage device or other computing device that is not shown) accessible by the computing devices 115.

After acquiring the collected images, the computing devices 115 can execute inter-group matching between the collected images and the images of the map elements in the electronic map, and execute intra-group matching among the collected images. Based on the two types of matching and the locations of the map elements, the computing devices 110 can update the locations of the to-be-updated map elements associated with the map elements.

Figure 2:
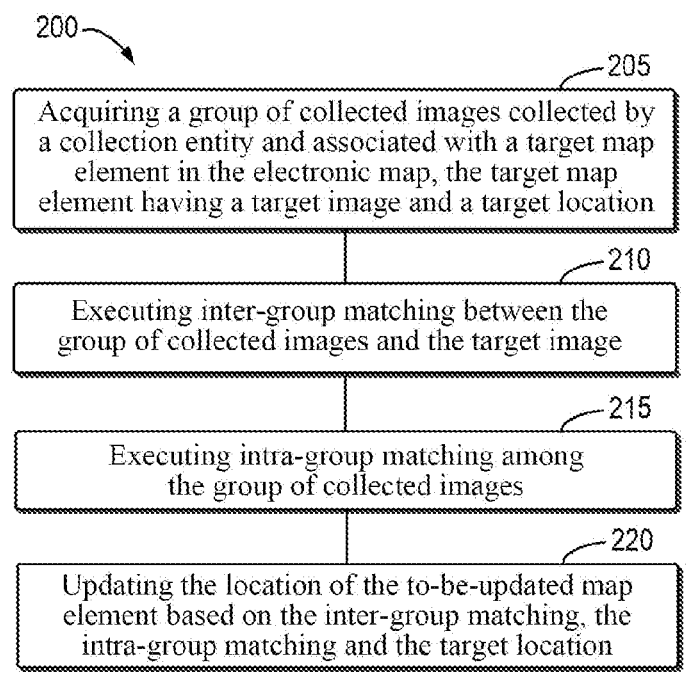
FIG. 2 shows a process diagram of an exemplary method for updating an electronic map according to some embodiments of the disclosure.

FIG. 2 shows a flow chart of an exemplary method 200 according to some embodiments of the disclosure. The method 200 can be executed by the computing device 115 in FIG. 1. In order to facilitate discussion, the method 200 will be described by referring to FIG. 1.

In box 205: acquiring a group of collected images collected by a collection entity 100 and associated with a target map element in the electronic map. The target map element may be the map element 105 in FIG. 1, or other map element that is in the vicinity of the map element 105, but not shown in FIG. 1.

The target map element has a target location. The target location may be denoted by location coordinates of the target map element. The coordinates may be two-dimensional coordinates or three-dimensional coordinates. The target location may be stored as electronic map data. The target map element further has a group of target images. The target images may be stored as electronic map data, too. Alternatively, the target images may be stored separately but are associated with the target location. As mentioned above, the target location and the target images may be stored in the computing device 115 locally, or in other devices accessible by the computer device 115.

The target images of the target map element can be collected by at least one of a special surveying and mapping vehicle or surveying and mapping equipment, and be uploaded into the computing device 115. As an alternative, the target images can be collected by a collection entity when the collection entity is traveling in the vicinity of the target map element, and be uploaded into the computing device 115.

The computing device 115 can acquire the collected images associated with the target map element in any appropriate way. A process of acquiring the collected images will be described in detail hereinafter by referring to a method 300 shown in FIG. 3.

Figure 3:
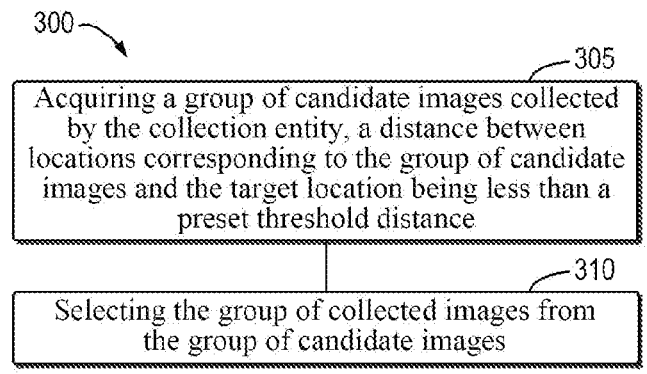
FIG. 3 shows a process diagram of an exemplary method for acquiring a collected image according to some embodiments of the disclosure.

As shown in FIG. 3, in block 305, the computing device 115 acquires a group of candidate images collected by the collection entity 110. Distances between locations corresponding to respective candidate images and the target location of the target image are less than a preset threshold distance. The threshold distance can be determined based on positioning precision, the number of images, and a processing capacity of the computing device 115. In this way, images collected by the collection entity in the vicinity of the target map element can be determined.

In some embodiments, the candidate images can be selected from original images collected by the collection entity 110. For example, the collection entity 110 can upload a group of collected original images and corresponding locations to the computing device 115. The locations can be determined by any appropriate positioning technology. For example, in an embodiment where the environment 100 is an outdoor environment, the locations of the collection entity 110 can be determined with the help of a global navigation satellite system (GNSS). Examples of the GNSS include, but are not limited to, a Global Positioning System (GPS), a Galileo Positioning System (GALILEO), a Beidou Satellite Positioning System (BDS), etc. In an embodiment where the environment 100 is an indoor environment, the locations of the collection entity 110 can be determined using a variety of indoor positioning systems (IPS for short). Furthermore, the locations of the collection entity 110 can be determined using a triangulation technology based on a location of a reference object in the environment 100.

After acquiring the original images and corresponding locations thereof, the computing device 115 can compare the locations corresponding to the original images with the target location of the target image, to select original images having a distance between the locations of the original images and the target location less than the preset threshold distance as the candidate images. In this way, the computing device 115 can select candidate images collected in the vicinity of the target location of the target map element from the images collected by the collection entity 110 at random locations for subsequent processing.

In some embodiments, the computing device 115 can indicate the target location to the collection entity 110. For example, when it is necessary to validate a map element at a certain location, the computing device 115 can execute the indication. Accordingly, the collection entities can collect images when passing by candidate locations in the vicinity of the target location (for example, distance between the candidate locations and the target location less than the preset threshold distance), and upload the collected images as candidate images into the computing device 115. This fixed-point collection approach can further improve the efficiency in collecting images by the computing device 115.

After acquiring the candidate images, in box 310, the computing device 115 can select to-be-processed collected images from the candidate images. In some embodiments, the candidate images can be directly used as collected images associated with the target image.

In some embodiments, in order to further improve the image processing efficiency, relevance between the candidate images and the target image can be determined by matching between the candidate images and the target image, and the candidate images having the relevance higher than a preset threshold can be used as the collected images associated with the target image. The matching can be implemented using any appropriate image characteristic extraction and matching technology that is currently available or will be developed in the future. This matching can be used, for example, to find candidate images that include the target map element, or to find candidate images that exclude the target map element but include other map elements or reference objects in the vicinity of the target map element, for use as the to-be-processed collected images. In the above image matching process, image recognition can be further executed to determine map elements included in the image, to discard irrelevant information in subsequent processing, and to further improve a processing efficiency.

Then, please further refer to FIG. 2. After acquiring a group of collected images associated with the target image, in box 210, the computing device 115 executes the inter-group matching between the group of collected images and the target image. For example, the computing device 115 can match a collected image with the target image, thereby determining a location of the collection entity 110 relative to the target map element when collecting the collected image. Likewise, the inter-group matching can be implemented using any appropriate image characteristic extraction and matching technology that is currently available or will be developed in the future. By matching each collected image in the group of collected images with the target image, a group of locations of the collection entity 110 relative to the target map element when collecting the group of collected images may be determined.

In box 215, the computing device 115 executes intra-group matching among the group of collected images. By the intra-group matching, location change of the collection entity 110 during collecting the images can be determined. In some embodiments, time of collecting the group of images by the collection entity 110 is continuous. For example, the group of collected images can be a group of continuous image frames. In this case, the intra-group matching can be implemented by executing matching between every two adjacent collected images. Thus, the location changes of the collection entity 110 during collecting every two adjacent collected images can be determined. With the location changes, the relative location between the collection entity 110 and the target map element obtained by the inter-group matching can be corrected, thus improving the positioning precision.

In box 220, the computing device 115 updates the location of the to-be-updated map element based on the inter-group matching between the collected images and the target map element, the intra-group matching between the collected images, and the target location of the target map element. In some embodiments, the to-be-updated map element may be the target map element. For example, the target map element can be determined to be the to-be-updated map element, when each of the collected images includes the target map element. In some embodiments, the to-be-updated map element may be a map element associated with the target map element, or a map element excluded in the electronic map. In this case, the computing device 115 can determine a map element associated with the target map element (e.g., in the vicinity of the target map element) and excluded in the electronic map in the collected images as the to-be-updated map element.

In some embodiments, the computing device 115 can determine a group of reference absolute locations of the collection entity 110 during collecting the group of collected images based on the inter-group matching, the intra-group matching, and the target location of the target map element. For example, the computing device 115 can determine a corresponding relationship between feature points of a plurality of collected images, and determine a corresponding relationship between the feature points of the collected images and a target image of the target map element. The computing device 115 can determine the relative locations between the collection entity 110 and the target map element. The computing device 115 can determine the reference absolute locations of the collection entity 110 based on the relative locations and the target location of the target map element.

The computer device 115 can further determine reference location change of the collection entity 110 during collecting the group of collected images and reference relative locations between the to-be-updated map element and the collection entity 110 based on the intra-group matching. For example, by three-dimensional reconstruction, the computing device 115 can calculate a pose of the collection entity 110 when collecting images, and then determine relative locations between the feature points of the collected images and the collection entity 110. The reference relative locations between the to-be-updated map element and the collection entity 110 can be calculated based on the feature points of the images identified as the to-be-updated map element. Then, the computing device 115 can determine the location of the to-be-updated map element based on the determined reference absolute positions, the reference location change, and the reference relative locations.

In some embodiments, in order to further improve the positioning precision, the computing device 115 can further update the location of the to-be-updated map element using images collected by other collection entity. For example, the computing device 115 can acquire other group of collected images that are collected by the other collection entity and are associated with the target map element, and execute inter-group matching between the other group of collected images and the target image of the target map element, and intra-group matching among the other group of collected images. Then, the computing device 115 can further update the location of the to-be-updated map element based on the inter-group matching, the intra-group matching, and the target location of the target map element. A more precise location of the to-be-updated map element is obtained by fusing the processing results associated with the collected images collected by a plurality of collection entities.

As mentioned above, some collection entities further have an image processing function other than a function of collecting images. Such collection entities can automatically process collected images, to determine and upload a reference updated location of the to-be-updated map element. In this case, the computing device 115 can further update the location of the to-be-updated map element based on the reference updated location to further improve the positioning precision.

Figure 4:
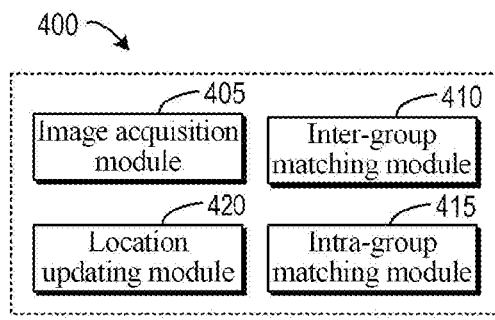
FIG. 4 shows a schematic block diagram of an exemplary apparatus for updating an electronic map according to some embodiments of the disclosure.

FIG. 4 shows a schematic block diagram of an exemplary apparatus 400 for updating an electronic map according to some embodiments of the disclosure. The apparatus 400 can be executed by the computing device 115 in FIG. 1.

As shown in FIG. 4, the apparatus 400 includes: an image acquisition module 405 configured for acquiring a group of collected images collected by a collection entity and associated with a target map element in the electronic map, the target map element having a target image and a target location; an inter-group matching module 410 configured for executing inter-group matching between the group of collected images and the target image; an intra-group matching module 415 configured for executing intra-group matching among the group of collected images; and a location updating module 420 configured for updating a location of a to-be-updated map element associated with the target map element based on the inter-group matching, the intra-group matching and the target location.

In some embodiments, the image acquisition module may further include: a first acquisition module configured for acquiring a group of candidate images collected by the collection entity, a distance between locations corresponding to the group of candidate images and the target location being less than a preset threshold distance; and a first selection module configured for selecting the group of collected images from the group of candidate images.

In some embodiments, the image acquisition module may further include: a second acquisition module configured for acquiring a group of original images collected by the collection entity and locations corresponding to the original images; a second selection module configured for selecting an original image from the group of original images; a distance determining module configured for determining whether a distance between a location corresponding to the selected original image and the target location is less than the preset threshold distance; and a first determining module configured for determining the selected original image is included in the group of candidate images, in response to determining the distance is less than the preset threshold distance.

In some embodiments, the image acquisition module may include: an indication module configured for indicating the target location to the collection entity, to enable the collection entity to collect images at candidate locations where a distance between the collection entity and the target location is less than the preset threshold distance; and a third acquisition module configured for acquiring a group of images collected by the collection entity at the candidate locations as the group of candidate images.

In some embodiments, the first selection module may include: a third selection module configured for selecting a candidate image from the group of candidate images; a relevance determining module configured for determining whether a relevance between the selected candidate image and the target image is higher than a preset threshold relevance; and a second determining module configured for determining the selected candidate image is included in the group of collected images, in response to determining the relevance is higher than the preset threshold relevance.

In some embodiments, the inter-group matching module may include: a first matching module configured for matching one collected image of the group of collected images with the target image, to determine a relative location between the collection entity and the target map element when collecting the collected image.

In some embodiments, time of collecting the group of images by the collection entity is continuous. The intra-group matching may include: a second matching module configured for matching two adjacent collected images of the group of collected images, to determine location change of the collection entity during collecting the two adjacent collected images.

In some embodiments, the location updating module includes: a third determining module configured for determining a group of reference absolute locations of the collection entity when collecting the group of collected images based on the inter-group matching, the intra-group matching, and the target location; a fourth determining module configured for determining reference location change of the collection entity during collecting the group of collected images and a reference relative location between the to-be-updated map element and the collection entity based on the intra-group matching; and a first updating module configured for updating the location of the to-be-updated map element based on the reference absolute position, the reference location change, and the reference relative position.

In some embodiments, the apparatus 400 may further include: a fifth determining module configured for determining the target map element is the to-be-updated map element, in response to each collected image in the group of collected images including the target map element.

In some embodiments, the apparatus 400 may further include: a sixth determining module configured for determining a map element associated with the target map element and excluded in the electronic map in the group of collected images as the to-be-updated map element.

In some embodiments, the apparatus 400 may further include: a fourth acquisition module configured for acquiring another group of collected images collected by another collection entity and associated with the target map element; a fifth matching module configured for executing additional inter-group matching between the another group of collected images and the target image, and additional intra-group matching between the another group of collected images; and a second updating module configured for further updating the location of the to-be-updated map element based on the additional inter-group matching, the additional intra-group matching, and the target location.

In some embodiments, the apparatus 400 may further include: a fifth acquisition module configured for acquiring a reference updated location of the to-be-updated map element determined by the another collection entity; and a third updating module configured for further updating the location of the to-be-updated map element based on the reference updated location.

It should be understood that, the operations and features described hereinbefore in conjunction with FIG. 1 to FIG. 3 are also applicable to the apparatus 400 and the modules included therein, which have identical effects, and specific details of which are not repeated any more.

The modules included in the apparatus 400 may be implemented in a variety of ways, including software, hardware, firmware, or any combination thereof. In one embodiment, one or more modules may be implemented by at least one of software or firmware, e.g., a machine executable instruction stored on a storage medium. In addition to the machine executable instruction or as an alternative, parts or all of the modules in the apparatus 400 can be implemented at least partially by one or more logical components of hardware. As an example, non-limiting usable exemplary logical components of hardware include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

Figure 5:
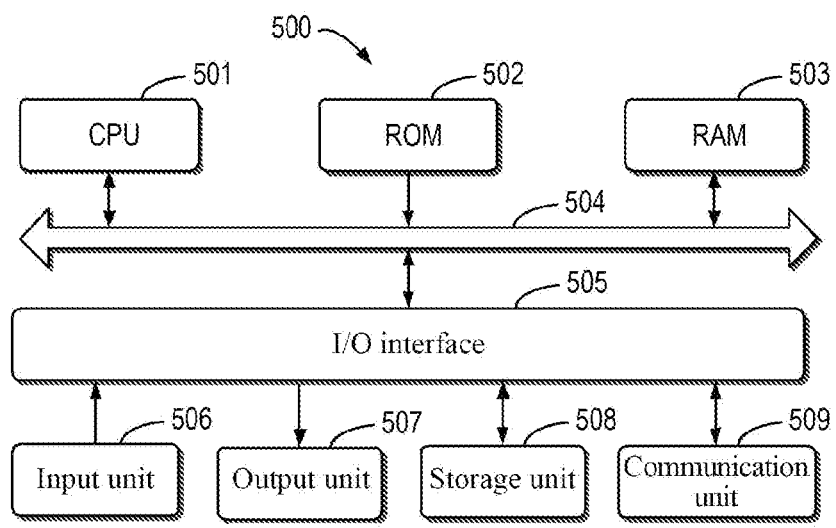
FIG. 5 shows a block diagram of a device capable of implementing a plurality of embodiments of the disclosure.

FIG. 5 shows a schematic block diagram of an exemplary device 500 capable of implementing various embodiments of the present disclosure. The device 500 may be used to implement the computing device 115 in FIG. 1. As shown in the figure, the device 500 includes a central processing unit (CPU) 501 that may perform various appropriate actions and processing in accordance with computer program instructions stored in a read only memory (ROM) 502 or computer program instructions loaded into a random access memory (RAM) 503 from a storage unit 508. In the RAM 503, various programs and data required for the operation of the device 500 may also be stored. The CPU 501, the ROM 502, and the RAM 503 are connected to each other through a bus 504. An input/output (I/O) interface 505 is also coupled to the bus 504.

A plurality of components in the device 500 are coupled to the I/O interface 505, including: an input unit 506, such as a keyboard or a mouse; an output unit 507, such as various types of displays, or speakers; the storage unit 508, such as a disk or an optical disk; and a communication unit 509 such as a network card, a modem, or a wireless communication transceiver. The communication unit 509 allows the device 500 to exchange information/data with other devices over a computer network such as the Internet and/or various telecommunication networks.

The processing unit 501 performs the various methods and processes described above, such as the process 200 and/or the process 300. For example, in some embodiments, the process 200 and/or the process 300 may be implemented as a computer software program that is tangibly embodied in a machine readable medium, such as the storage unit 508. In some embodiments, some or all of the computer programs may be loaded and/or installed onto the device 500 via the ROM 502 and/or the communication unit 509. When a computer program is loaded into the RAM 503 and executed by the CPU 501, one or more of the actions or steps of the process 200 and/or the process 300 described above may be performed. Alternatively, in other embodiments, the CPU 501 may be configured to perform the process 200 and/or the process 300 by any other suitable means (e.g., by means of firmware).

The functions described herein above may be performed, at least in part, by one or more hardware logic components. For example, and without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general-purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine-readable medium may be a tangible medium that may contain or store programs for use by or in connection with an instruction execution system, apparatus, or device. The machine-readable medium may be a machine readable signal medium or a machine readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various actions are described in a specific order, this should not be understood that such actions are required to be performed in the specific order shown or in sequential order, or all illustrated actions should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A method for updating an electronic map, comprising:
acquiring a group of collected images collected by a collection entity and associated with a target map element in the electronic map, the target map element having a target image and a target location of a given target object, wherein the target location and the target image of the given target object are included in the electronic map, wherein the target image comprises the given target object, the target map element represents the given target object, and each of the collected images comprises the given target object and is collected by the collection entity at a different position of a road;
executing inter-group matching between the group of collected images and the target image, the inter-group matching comprising: determining a relative location between the collection entity and the target map element when the collection entity collects the collected image, by matching the collected images with the target image respectively;
executing intra-group matching among the group of collected images, the intra-group matching comprising: determining a location change of the collection entity when the collection entity collects the collected images, by matching the collected images;
updating a location of a to-be-updated map element associated with the target map element based on the inter-group matching, the intra-group matching and the target location, wherein the updating a location of a to-be-updated map element comprise: determining a reference absolute location of the collection entity when collecting the collected image based on the location of the target map element, and the relative location between the collection entity and the target map element; determining a reference relative location between the to-be-updated map element and the collection entity; and updating the location of the to-be-update map element based on the reference absolute location, the reference relative location, and the location change of the collection entity; and
controlling a vehicle using the electronic map with the updated location.

2. The method according to claim 1, wherein the acquiring the group of collected images comprises:
acquiring a group of candidate images collected by the collection entity, a distance between locations corresponding to the group of candidate images and the target location being less than a preset threshold distance; and
selecting the group of collected images from the group of candidate images.

3. The method according to claim 2, wherein the acquiring the group of candidate images comprises:
acquiring a group of original images collected by the collection entity and locations corresponding to the original images;
selecting an original image from the group of original images;
determining whether a distance between a location corresponding to the selected original image and the target location is less than the preset threshold distance; and
determining the selected original image is included in the group of candidate images, in response to determining the distance is less than the preset threshold distance.

4. The method according to claim 2, wherein the acquiring the group of candidate images comprises:
indicating the target location to the collection entity, to enable the collection entity to collect images at candidate locations where a distance between the collection entity and the target location is less than the preset threshold distance; and
acquiring a group of images collected by the collection entity at the candidate locations as the group of candidate images.

5. The method according to claim 2, wherein the selecting the group of collected images comprises:
selecting a candidate image from the group of candidate images;
determining whether a relevance between the selected candidate image and the target image is higher than a preset threshold relevance; and
determining the selected candidate image is included in the group of collected images, in response to determining the relevance is higher than the preset threshold relevance.

6. The method according to claim 1, wherein time of the acquiring the group of collected images by the collection entity is continuous, and the executing the intra-group matching comprises:
matching two adjacent collected images in the group of collected images, to determine location change of the collection entity during collecting the two adjacent collected images.

7. The method according to claim 1, further comprising:
determining the target map element is the to-be-updated map element, in response to each collected image in the group of collected images including the target map element.

8. The method according to claim 1, further comprising:
determining a map element associated with the target map element and excluded in the electronic map in the group of collected images as the to-be-updated map element.

9. The method according to claim 1, further comprising:
acquiring another group of collected images collected by another collection entity and associated with the target map element;
executing additional inter-group matching between the another group of collected images and the target image, and additional intra-group matching between the another group of collected images; and
further updating the location of the to-be-updated map element based on the additional inter-group matching, the additional intra-group matching, and the target location.

10. The method according to claim 1, further comprising:
acquiring a reference updated location of the to-be-updated map element determined by the another collection entity; and
further updating the location of the to-be-updated map element based on the reference updated location.

11. An apparatus for updating an electronic map, comprising:
at least one processor; and
a memory storing instructions, the instructions when executed by the at least one processor, cause the at least one processor to perform operations, the operations comprising
acquiring a group of collected images collected by a collection entity and associated with a target map element in the electronic map, the target map element having a target image and a target location of a given target object, wherein the target location and the target image of the given target object are included in the electronic map, wherein the target image comprises the given target object, the target map element represents the given target object, and each of the collected images comprises the given target object and is collected by the collection entity at a different position of a road;

executing inter-group matching between the group of collected images and the target image, the inter-group matching comprising: determining a relative location between the collection entity and the target map element when the collection entity collects the collected image, by matching the collected images with the target image respectively;

executing intra-group matching among the group of collected images, the intra-group matching comprising: determining a location change of the collection entity when the collection entity collects the collected images, by matching the collected images;

updating a location of a to-be-updated map element associated with the target map element based on the inter-group matching, the intra-group matching and the target location, wherein the updating a location of a to-be-updated map element comprise: determining a reference absolute location of the collection entity positioning a device using the electronic map with the updated location when collecting the collected image based on the location of the target map element, and the relative location between the collection entity and the target map element;

determining a reference relative location between the to-be-updated map element and the collection entity; and updating the location of the to-be-update map element based on the reference absolute location, the reference relative location, and the location change of the collection entity; and controlling a vehicle using the electronic map with the updated location.

12. The apparatus according to claim 11, wherein the acquiring the group of collected images comprises:
acquiring a group of candidate images collected by the collection entity, a distance between locations corresponding to the group of candidate images and the target location being less than a preset threshold distance; and
selecting the group of collected images from the group of candidate images.

13. The apparatus according to claim 12, wherein the acquiring the group of candidate images comprises:
acquiring a group of original images collected by the collection entity and locations corresponding to the original images;
selecting an original image from the group of original images;
determining whether a distance between a location corresponding to the selected original image and the target location is less than the preset threshold distance; and
determining the selected original image is included in the group of candidate images, in response to determining the distance is less than the preset threshold distance.

14. The apparatus according to claim 12, wherein the acquiring the group of candidate images comprises:
indicating the target location to the collection entity, to enable the collection entity to collect images at candidate locations where a distance between the collection entity and the target location is less than the preset threshold distance; and acquiring a group of images collected by the collection entity at the candidate locations as the group of candidate images.

15. The apparatus according to claim 12, wherein the selecting the group of collected images comprises:
selecting a candidate image from the group of candidate images;
determining whether a relevance between the selected candidate image and the target image is higher than a preset threshold relevance; and
determining the selected candidate image is included in the group of collected images, in response to determining the relevance is higher than the preset threshold relevance.

16. The apparatus according to claim 11, wherein time of the acquiring the group of collected images by the collection entity is continuous, and the executing the intra-group matching comprises:
matching two adjacent collected images in the group of collected images, to determine location change of the collection entity during collecting the two adjacent collected images.

17. The apparatus according to claim 11, wherein the operations further comprise:
determining the target map element is the to-be-updated map element, in response to each collected image in the group of collected images including the target map element.

18. The apparatus according to claim 11, wherein the operations further comprise:
determining a map element associated with the target map element and excluded in the electronic map in the group of collected images as the to-be-updated map element.

19. The apparatus according to claim 11, wherein the operations further comprise:
acquiring another group of collected images collected by another collection entity and associated with the target map element;
executing additional inter-group matching between the another group of collected images and the target image, and additional intra-group matching between the another group of collected images; and
further updating the location of the to-be-updated map element based on the additional inter-group matching, the additional intra-group matching, and the target location.

20. The apparatus according to claim 11, wherein the operations further comprise:
acquiring a reference updated location of the to-be-updated map element determined by the another collection entity; and
further updating the location of the to-be-updated map element based on the reference updated location.

21. A non-transitory computer readable storage medium, storing a computer program therein, wherein the program, when executed by a processor, cause the processor to perform operations, the operations comprising:
acquiring a group of collected images collected by a collection entity and associated with a target map element in the electronic map, the target map element having a target image and a target location of a given target object, wherein the target location and the target image of the given target object are included in the electronic map, wherein the target image comprises the given target object, the target map element represents the given target object, and each of the collected images comprises the given target object and is collected by the collection entity at a different position of a road;

executing inter-group matching between the group of collected images and the target image, the inter-group matching comprising: determining a relative location between the collection entity and the target map element when the collection entity collects the collected image, by matching the collected images with the target image respectively;

executing intra-group matching among the group of collected images, the intra-group matching comprising: determining a location change of the collection entity when the collection entity collects the collected images, by matching the collected images; and updating a location of a to-be-updated map element associated with the target map element based on the inter-group matching, the intra-group matching and the target location, wherein the updating a location of a to-be-updated map element comprise: determining a reference absolute location of the collection entity positioning a device using the electronic map with the updated location when collecting the collected image based on the location of the target map element, and the relative location between the collection entity and the target map element;

determining a reference relative location between the to-be-updated map element and the collection entity; and updating the location of the to-be-update map element based on the reference absolute location, the reference relative location, and the location change of the collection entity; and controlling a vehicle using the electronic map with the updated location.

\* \* \* \* \*